US012482600B2

(12) United States Patent
Park

(10) Patent No.: US 12,482,600 B2
(45) Date of Patent: Nov. 25, 2025

(54) METHOD FOR MANUFACTURING POLE-MOUNTED TRANSFORMER USING NO INSULATION OIL AND POLE-MOUNTED TRANSFORMER MANUFACTURED USING SAME

(71) Applicant: CHERYONG ELECTRIC CO., LTD., Seoul (KR)

(72) Inventor: Jong Tae Park, Seoul (KR)

(73) Assignee: CHERYONG ELECTRIC CO., LTD., Seoul (KR)

( * ) Notice: Subject to any disclaimer, the term of this patent is extended or adjusted under 35 U.S.C. 154(b) by 536 days.

(21) Appl. No.: 17/922,630

(22) PCT Filed: Sep. 23, 2020

(86) PCT No.: PCT/KR2020/012864

§ 371 (c)(1),
(2) Date: Nov. 1, 2022

(87) PCT Pub. No.: WO2021/225232

PCT Pub. Date: Nov. 11, 2021

(65) Prior Publication Data

US 2023/0215625 A1 Jul. 6, 2023

(30) Foreign Application Priority Data

May 4, 2020 (KR) ........................ 10-2020-0053150

(51) Int. Cl.
*H01F 7/06* (2006.01)
*H01F 27/24* (2006.01)
(Continued)

(52) U.S. Cl.
CPC ............. *H01F 41/06* (2013.01); *H01F 27/24* (2013.01); *H01F 27/32* (2013.01); *H01F 41/12* (2013.01)

(58) Field of Classification Search
CPC ........ H01F 27/06; H01F 27/24; H01F 27/306; H01F 27/32; H01F 27/327; H01F 41/06; H01F 41/12; H01F 41/127
See application file for complete search history.

(56) References Cited

U.S. PATENT DOCUMENTS

2011/0257924 A1* 10/2011 Bryant .................. H01F 27/402
702/122
2013/0043966 A1* 2/2013 Singh .................... H01F 27/327
336/192
2019/0088411 A1 3/2019 Zhi et al.

FOREIGN PATENT DOCUMENTS

JP H05243068 A 9/1993
KR 20010042234 A 5/2001
(Continued)

*Primary Examiner* — Paul D Kim
(74) *Attorney, Agent, or Firm* — Best & Flanagan LLP

(57) ABSTRACT

The present invention relates to a method for manufacturing a pole-mounted transformer using no insulation oil, and a pole-mounted transformer manufactured using same, wherein the transformer uses a solid insulation material and an insulation oil is removed from the transformer, and more specifically, to a method for manufacturing a pole-mounted transformer using no insulation oil and a pole-mounted transformer manufactured using same, the method comprising: a first coil part formation step of winding a low-voltage coil and a high-voltage coil to produce a first coil part; a casting step of putting the first coil part into a mold and filling an empty space between the outer peripheral portion of the first coil part and a wound wire with a casting insulation material in a liquid or gel phase, followed by solidification, so as to produce a second coil part; a conductive material attachment step of coupling a conductive material to the outer peripheral surface of the second coil part to produce a third coil part; an iron core coupling step of coupling an iron core to the third coil part; and a
(Continued)

transformer completion step of inserting, into an outer case, the third coil part having the iron core coupled thereto to complete a product.

7 Claims, 2 Drawing Sheets

(51) Int. Cl.

| | |
|---|---|
| ***H01F 27/32*** | (2006.01) |
| ***H01F 41/06*** | (2016.01) |
| ***H01F 41/12*** | (2006.01) |

(56) References Cited

FOREIGN PATENT DOCUMENTS

| | | | |
|---|---|---|---|
| KR | 100795572 | B1 | 1/2008 |
| KR | 20100112772 | A | 10/2010 |
| KR | 101481057 | B1 | 1/2015 |
| KR | 102152956 | B1 | 9/2020 |

* cited by examiner

METHOD FOR MANUFACTURING POLE-MOUNTED TRANSFORMER USING NO INSULATION OIL AND POLE-MOUNTED TRANSFORMER MANUFACTURED USING SAME

TECHNICAL FIELD

The present invention relates to a method for manufacturing a pole-mounted transformer using no insulation oil and a pole-mounted transformer manufactured using the same, and more particularly, a method for manufacturing a pole-mounted transformer using no insulation oil in which a solid insulating material is used instead of an insulation oil filling the inside of the pole-mounted transformer, and a pole-mounted transformer manufactured using the method.

BACKGROUND ART

FIG. 1 shows photographs representing accidents occurring in general pole-mounted oil-filled transformers using an insulation oil, and problems of these pole-mounted oil-filled transformers will be described with reference to this figure.

At present, pole-mounted transformers installed on electric poles are pole-mounted oil-filled transformers. The pole-mounted oil-filled transformer, in which the inside of an outer case is filled with an insulation oil, may cause life damage and property damage due to fire and insulation accidents due to deterioration of insulation due to inflow of moisture.

Further, the insulation oil contains a small amount of poly-chlorinated biphenyl (PCB), and PCB may cause environmental problems to the natural world, such as human bodies, ecosystems, etc.

In addition, the pole-mounted transformer requires periodic analysis work depending on degradation of the insulation oil, and thus has high possibility of being exposed to the risk of safety accidents. That is, whether or not the insulation oil is abnormal is diagnosed depending on dissolved gas management standards and the degree of degradation of the insulation oil is determined depending on $CO_2$ gas management standards, and the existing insulation oil should be replaced with a new insulation oil upon determining that the existing insulation oil is unsuitable. Here, since the insulation oil includes a large percentage of flammable substances, the insulation oil comes into contact with the atmosphere during a replacement process, and may thus cause ignition, explosion, fire or the like.

Further, a worker may be exposed to a safety accident when a Cut Out Switch (COS) is reclosed, i.e., a worker's safety accident may occur due to explosion of the transformer when power is turned on again in the state in which the transformer is out of order.

Further, when a wooden telephone pole is used, there are risks of breakdown of a wire and occurrence of a secondary accident due to burning, and particularly, when a wooden telephone pole is installed in forested areas, fire and environmental destruction problems are on the rise, and when a wooden telephone pole is installed in salty and dusty areas, such as beaches, the outer case is corroded, and thus degrades the appearance of the telephone pole and causes environmental pollution due to outflow of the insulation oil.

In addition, corrosion of the outer case which protects an iron core and a wound coil of the transformer from the outside, occurrence of a gap at a joint part of the outer case or split of a welded part of the outer case may cause leakage of the insulation oil, and may thus cause problems, such as degradation of performance of the transformer due to lack of the insulation oil within the outer case of the transformer, insulation breakdown, and environmental pollution.

Moreover, the above pole-mounted transformer requires protection devices, such as an Internal Fault Detector (IFD), a Pressure Release Valve (PRV) and a Sudden Pressure Release Device (SPRD), so as to reduce internal pressure when an internal fault occurs.

DISCLOSURE

Technical Problem

The present invention is made to solve the above problems, and provides a method for manufacturing a pole-mounted transformer using no insulation oil in which a solid insulating material is used instead of an insulation oil so as to prevent various accidents caused by use of the insulation oil, and a pole-mounted transformer manufactured using the method.

Technical Solution

One embodiment provides a method for manufacturing a pole-mounted transformer using no insulation oil, including producing a first coil part by winding a low-voltage coil and a high-voltage coil, performing casting by putting the first coil part into a mold and injecting a cast insulating material in a liquid state or a gel state into the mold to surround an outer circumferential portion of the first coil part while filling empty spaces in the wound coils, so as to produce a second coil part, attaching a conductive material to an outer circumferential surface of the second coil part, so as to produce a third coil part, coupling an iron core to the third coil part, and completing manufacture of a pole-mounted transformer product by inserting the third coil part having the iron core coupled thereto into an outer case.

Further, in the producing the first coil part, the low-voltage coil may be wound into a circular shape or a polygonal shape, and, when the low-voltage coil is wound into the polygonal shape, edges of the low-voltage coil wound into the polygonal shape may be rounded to have a radius of curvature of 10-20 mm.

Further, when low-voltage coil is wound, a low-voltage side conductor and a rubber-based solid insulating material formed of a polymer having Shore hardness of 25-75 and elongation of 200-300% may be wound together.

Further, in the producing the first coil part, at least one of non-woven fabric, an insulating film or insulating paper may be interposed between the low-voltage coil and the high-voltage coil.

Further, in the producing the first coil part, a conductive member having a surface resistance value of 3,000-8,000 Ω/square may be interposed between the low-voltage coil and the high-voltage coil.

Further, in the producing the first coil part, when the high-voltage coil is wound, an insulation distance may be maintained by interposing at least one of aramid, PEN, PET or glass fiber between layers or discs of the high-voltage coil.

Further, a distance between an outer surface of the first coil part and an outer surface of the second coil part may be 4-30 mm.

Further, the cast insulating material may include 50-68 wt % of silicon dioxide or calcium silicate based on a total weight of the cast insulating material (100 wt %).

Further, the conductive material may have a surface resistance value of 2,000-8,000 Ω/square.

Further, in the coupling the iron core to the third coil part, when a wound core is applied as the iron core, steps of the iron core may be located within the wound coils.

Further, after the third coil part having the iron core coupled thereto is inserted into the outer case, an empty space within the outer case may be filled with a polymer-based insulating material having thermal conductivity of 0.5 W/mK or more, Shore hardness of 30-70, viscosity of 3,000 mPa-s or less, and may be sealed.

Another embodiment provides a pole-mounted transformer manufactured by the above-described method.

Advantageous Effects

The above-described present invention has the following effects.

First, when the coil is wound into a polygonal shape, edges of a winding mandrel are rounded to have a radius of curvature of 10-20 mm, thereby being capable preventing increase in the total size of the transformer due to increase in a space with the iron core which will be subsequently assembled with the wound coils, and thus preventing rise in the manufacturing costs of the transformer.

Further, contraction and expansion of the conductor due to heat emitted from the inside of the low-voltage coil may be buffered by the rubber-based solid insulating material formed of the polymer having Shore hardness of 25-75 and elongation of 200-300%.

In addition, the low-voltage side conductor is connected to a low-voltage side terminal, which is formed in a polygonal shape, by welding, thereby being capable of reducing contact resistance and thus improving efficiency.

Moreover, at least one of non-woven fabric, an insulating film or insulating paper is interposed between the low-voltage coil and the high-voltage coil, thereby being capable of improving insulation properties between the wound low-voltage coil and the wound high-voltage coil.

Further, the conductive member having a surface resistance value of 3,000-8,000 Ω/square is interposed between the low-voltage coil and the high-voltage coil, and is grounded even in the event of insulation breakdown between the high-voltage side and the low-voltage side, thereby being capable of preventing electric potential rise of the low-voltage coil.

In addition, when the high-voltage coil is wound, at least one of aramid, polyethylene naphthalate (PEN), polyethylene terephthalate (PET) or glass fiber is interposed between layers or discs of the high-voltage coil, thereby being capable of maintaining an insulation distance.

Moreover, the insulating properties may be improved by removing moisture.

Furthermore, a distance between an outer surface of the first coil part and an outer surface of the second coil part is set to 4-30 mm by a casting process, thereby being capable of increasing insulation performance and improving mechanical stress.

In addition, the cast insulating material includes 50-68 wt % of silicon dioxide or calcium silicate based on the total weight of the cast insulating material (100 wt %), thereby having improved heat dissipation ability and improving efficiency in casting.

Further, the conductive material having a surface resistance value of 2,000-8,000 Ω/square is coupled to the outside of the third coil part, thereby being capable of lowering electric potential outside the third coil part.

In addition, when the iron core is manufactured, the number of the steps of the iron core is set to 5 to 10 using a step-lap method, thereby being capable of minimizing leakage flux and no-load loss of the iron core.

Moreover, when a wound core is applied as the iron core, steps of the iron core are located within the wound coils, thereby being capable of reducing iron loss and increasing short-circuit mechanical force.

Further, an empty space within the outer case is filled with an insulating material and thus no pressure is generated from the inside of the pole-mounted transformer, and therefore, does not require protection devices, such as an Internal Fault Detector (IFD), a Pressure Release Valve (PRV) and a Sudden Pressure Release Device (SPRD), which were used in the conventional pole-mounted oil-filled transformers, thereby being capable of achieving cost reduction, having a simplified external shape, and reducing noise.

In addition, the pole-mounted transformer uses no insulation oil, and may thus solve the above-described problems of the conventional pole-mounted oil-filled transformers.

BEST MODE

Hereinafter, reference will be made in detail to the preferred embodiments of the present invention, examples of which are illustrated in the accompanying drawings. Wherever possible, the same reference numbers will be used throughout the drawings to refer to the same or like parts. In the following description of the present invention, a detailed description of known functions and configurations incorporated herein will be omitted when it may make the subject matter of the invention rather unclear.

In the following description of the embodiments, terms, such as "first", "second", A, B, (a) and (b), are used. These terms serve only to distinguish one element from other elements, and the nature, the turn or the sequence of the element should not be construed as being limited by these terms. When an element or layer is referred to as being "connected to" or "coupled to" another element or layer, it may be directly connected or coupled to the other element or layer, or intervening elements or layers may be present.

Figure 1:
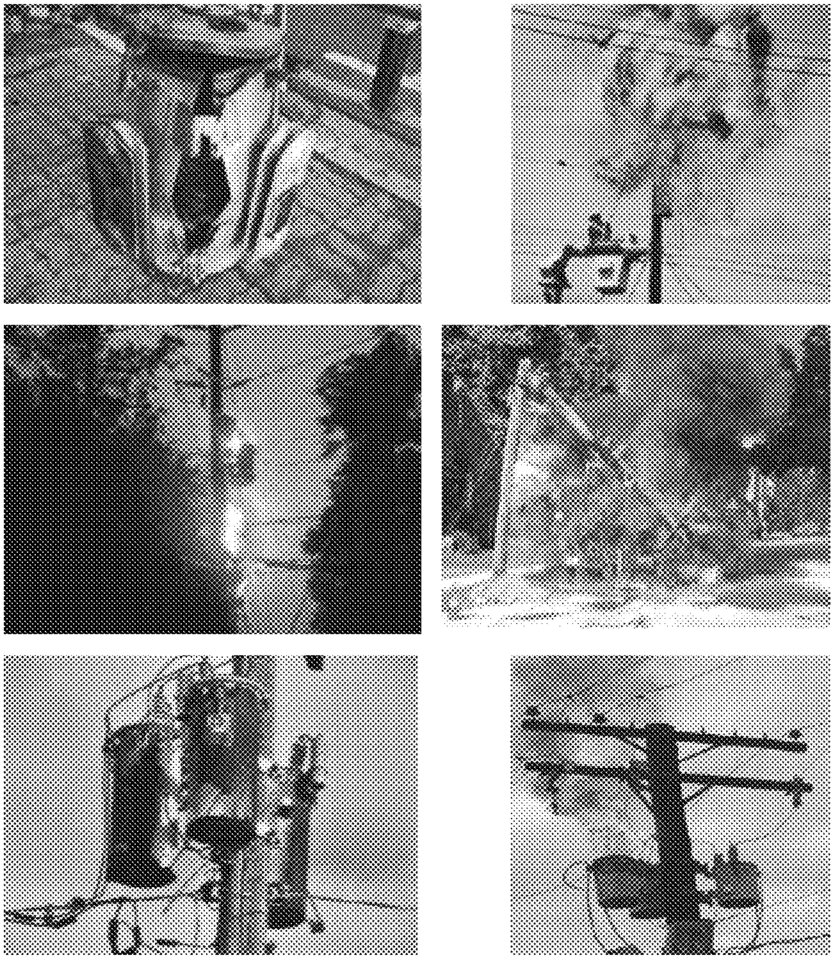
FIG. 1 shows photographs representing accidents occurring in general pole-mounted oil-filled transformers using an insulation oil.
Figure 2:
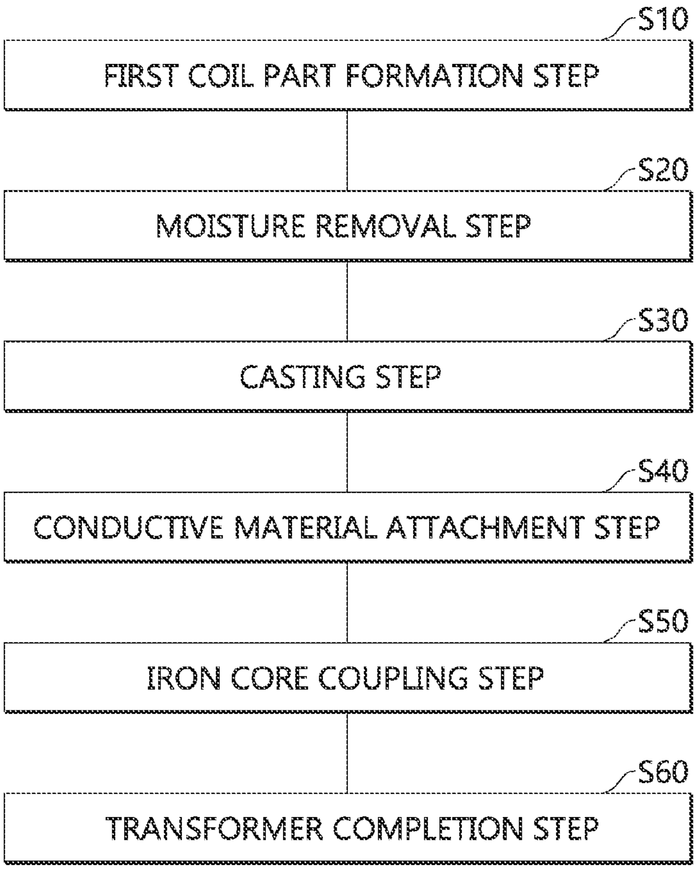
FIG. 2 is a flowchart representing a method for manufacturing a pole-mounted transformer using no insulation oil according to one embodiment of the present invention.

FIG. 2 is a flowchart representing a method for manufacturing a pole-mounted transformer using no insulation oil according to one embodiment of the present invention, and the method according to the present invention will be described with reference to this figure.

First, a pole-mounted transformer manufactured using the method according to the present invention uses a solid insulating material instead of an insulation oil so as to substitute for a pole-mounted oil-filled transformer using the insulation oil, and may have a similar configuration to that of a general solid insulation transformer but differs from the general solid insulation transformer in terms of a method for manufacturing the same, and thus, the method for manufacturing the pole-mounted transformer will be described in detail below.

The method for manufacturing the pole-mounted transformer using no insulation oil according to the present invention includes forming a first coil part (S10), performing casting (S30), attaching a conductive material (S40), coupling an iron core (S50), and completing the pole-mounted transformer (S60). The method may further include removing moisture (S20) after the producing the first coil part (S10).

In an operation of producing the first coil part (S10), a low-voltage coil and a high-voltage coil are wound to produce the first coil part.

The low-voltage coil is wound using a mold or a winding mandrel, and the mold or the winding mandrel is formed in a polygonal or circular shape. When the mold or the winding mandrel is formed in a polygonal shape, the edges of the mold or the winding mandrel may be rounded to have a radius of curvature of about 10-20 mm, so as to provide a constant tension to a conductor when the conductor is wound. That is, when the radius of curvature of the edges is less than 10 mm, it is difficult to provide a constant tension to the conductor during winding of the conductor, and thus, the wound coil is swollen and thus has an increased size. On the contrary, when the radius of curvature of the edges exceeds 20 mm, a space (a distance) between the third coil part and the iron core, which will be subsequently assembled to the third coil part, is increased, and thus, the overall shape of the transformer is increased and the manufacturing costs of the transformer are raised.

When the low-voltage coil is wound, a low-voltage side conductor and a rubber-based solid insulating material formed of a polymer having Shore hardness of 25-75 and elongation of 200-300% are wound together.

Here, in order to balance short-circuit mechanical force, one or two sheets of a plate-type conductor depending on current capacity. Further, in order to buffer contraction and expansion of the conductor due to heat emitted from the inside of the low-voltage coil, the rubber-based solid insulating material formed of the polymer is wound together. Here, when the Shore hardness of the polymer is less than 25, a buffering capacity for contraction and expansion of the conductor is excellent but it is difficult to support the conductor, and thus, the wound coils may be distorted, and, when the Shore hardness of the polymer exceeds 75, the buffering capacity is not sufficient, and thus, cracks may be caused. A low-voltage side terminal, which connects the low-voltage side conductor to the outside, is formed in a polygonal shape, and is connected to the low-voltage side conductor by penetration welding so as to improve efficiency due to reduction in contact resistance.

Further, in the operation of producing the first coil part (S10), at least one of non-woven fabric, an insulating film, or insulating paper, formed in a plate shape, in a lattice shape or in both the plate shape and the lattice shape, may be interposed between the low-voltage coil and the high-voltage coil. Dacron non-woven fabric, which is generally used to manufacture transformers, may be used as the non-woven fabric, and at least one of polyethylene naphthalate (PEN) or polyethylene terephthalate may be used as the insulating film. Aramid-based insulating paper may be used as the insulating paper.

In the operation of producing the first coil part (S10), a conductive member having a surface resistance value of 3,000-8,000 Ω/square may be interposed between the low-voltage coil and the high-voltage coil. The conductive member is grounded, and may induce voltage transmitted to the low-voltage side from the high-voltage side of the transformer to flow through grounding, when insulation between the high-voltage side and the low-voltage side of the transformer breaks down, so as to prevent electric potential rise of the low-voltage coil and to prevent damage, such as burn-out and contact of low-voltage apparatuses. Further, the conductive member may lower abnormal voltage, which may be transmitted to the low-voltage coil through the magnetic circuit of the iron core due to lightning impulse voltage introduced into the high-voltage coil. The conductive member may be formed by winding a conductive material having a plate shape or a lattice shape at least once, and may have the above-described surface resistance value so as to prevent a short-circuit caused by magnetic flux.

Further, the number of layers or the number of discs is determined to form the stable insulated state of the high-voltage coil depending on high-voltage side voltage, and the high-voltage coil is wound based on the determined number of the layers or the discs. For example, the high-voltage coil may be wound to form 7 layers or discs at a voltage of 7,200 V, and the high-voltage coil may be wound to form 13 layers or discs at voltage of 13,200 V.

When the high-voltage coil is wound, an insulation distance may be maintained using a plate-shaped film insulating material, a calendared insulating material, or a roved insulating material, which is provided between the layers or the discs. The plate-shaped film insulating material may employ PEN or PET, the calendared insulating material may employ aramid-based insulating paper, and the roved insulating material may employ glass fiber. Further, a conductor used in winding of the high-voltage coil may employ a bare conductor or an insulated conductor, the high-voltage coil may be wound using at least one conductor, i.e., one conductor or a plurality of conductors, and the conductor having a polygonal shape or a circular shape may be flattened and then wound so as to reduce the size of the high-voltage coil.

The first coil part is formed at room temperature in an air atmosphere. Therefore, after the operation of producing the first coil part (S10), in an operation of removing moisture (S20), the first coil part is dried in a convection oven, in which air is circulated up and down, at a temperature of 110-150° C. for at least 12 hours so as to remove moisture from the rubber-based solid insulating material formed of the polymer. Here, since the boiling point of water is 100° C., the minimum temperature of the inside of the oven may be set to 100° C. in consideration of temperature differences in the oven, and the maximum temperature of the inside of the oven may be set to 150° C. so as to prevent degradation of the rubber-based solid insulating material formed of the polymer.

In an operation of performing the casting (S30), the first coil part, from which moisture had been removed, is put into a mold, a cast insulating material in a liquid state or a gel state is injected into the mold to surround the outer circumferential portion of the first coil part while filling empty spaces in the first coil part, and is then solidified, thereby producing a second coil part.

First, in order to perform a casting process, the mold into which the first coil part has been put is assembled in consideration of the insulation distance depending on the high-voltage side voltage. Here, the mold is configured such that the insulation distance between the inner surface of the mold and the outer surface of the first coil part maintains 4-30 mm. When the insulation distance is less than 4 mm, insulating properties are insufficient and thus insulation breakdown may occur, and, when the insulation distance exceeds 30 mm, the manufactured transformer does not withstand mechanical stress occurring from the inside of the transformer during operation of the transformer and thus a crack may occur.

After assembly of the mold has been completed, the empty spaces of the first coil part, from which moisture has been removed, are filled with the cast insulating material. The cast insulating material may include a polymer-based thermosetting resin insulating material having a heat resistant temperature of 180° C. or higher, and, in order to improve mechanical strength and heat dissipation ability, the cast insulating material includes 50-68 wt % of silicon dioxide ($SiO_2$) or calcium silicate ($CaSiO_3$) based on the total weight of the cast insulating material (100 wt %) so as to have a thermal conductivity of 0.7 W/mK or more. Here, the cast insulating material may be used at a temperature of 70-145° C. and a pressure of 2-75 mbar. The casted second coil part is cured at a temperature of 70-155° C. for 4-20 hours. When the content of silicon dioxide or calcium silicate is less than 50 wt %, viscosity of the cast insulating material is low and thus the casting process may be easily performed, but the heat dissipation ability of the cast insulating material is poor, and, when the content of silicon dioxide or calcium silicate exceeds 68 wt %, the heat dissipation ability of the cast insulating material is improved but viscosity of the cast insulating material is high and thus the casting process may be difficult.

Further, a high-voltage side terminal may be provided in an IEEE Std. 386 200 A bushing well structure so that there is no exposed high-voltage side conductor after connection of the transformer, and thus, a worker may safely perform maintenance work.

In an operation of attaching the conductive material (S40), the conductive material is attached to the outer circumferential surface of the second coil part, thereby producing a third coil part.

The conductive material has a surface resistance value of 2,000-8,000 Ω/square, and the surface of the third coil part is also grounded. The conductive material is attached to the outer surface of the cured second coil part, thereby being capable of lowering electric potential outside the third coil part. Here, the conductive material configured to have the above-described characteristics may minimize stray load loss occurring in the transformer.

In an operation of coupling the iron core (S50), the iron core is coupled to the third coil part. The iron core for transformers is manufactured using a core-type or shell-type wound core or stacked core.

Further, in order to minimize leakage flux of the iron core and minimize no-load loss occurred in the iron core, a step-lap method is used, and the number of steps is set to 5 to 10. Here, as the number of steps increases, leakage flux may be reduced and thus loss generated from the core may be reduced, but the weight of the iron core handled by a worker during assembly is increased, and therefore, the number of steps may be flexibly adjusted within the range of 5 to 10 depending on the weight of the iron core.

Further, in order to reduce iron loss and to increase short-circuit mechanical force, the steps, which are coupling positions of the iron core, are located within the wound coils, and thereby, a separate frame structure configured to support the iron core may be omitted.

Finally, in an operation of completing the transformer (S60), the third coil part to which the iron core is coupled is inserted into an outer case, and respective structures are installed thereon and connected thereto, thereby completing manufacture of a product.

The outer case is manufactured to have a shape corresponding to the shape of the third coil part to which the iron core is coupled, and is manufactured to facilitate insertion of the third coil part there into while maintaining the minimum distance between the outer case and the third coil part. Here, an assembly of the iron core and the third coil part is inserted into an outer case main body. After the assembly has been inserted into the outer case main body, a front cover and an upper cover are assembled with the outer case main body, thereby completing assembly of the outer case. The outer case may be formed of a metallic material, and the surface of the outer case may be coated with a material having weather resistance and corrosion resistance.

After the third coil part has been inserted into the outer case, an empty space in the outer case is filled with a polymer-based insulating material having flammability rating of UL 94 V-0, thermal conductivity of 0.5 W/mK or more, Shore hardness of 30-70, viscosity of 3,000 mPa-s or less, and is sealed. The higher the thermal conductivity, the better, but the higher the price, the higher the manufacturing cost. Therefore, it is desirable to set the lowest value of thermal conductivity to 0.5 W/mK in order to meet the temperature rise within the allowable range with customer specifications while considering the price.

When the Shore hardness of the insulating material is less than 30, mechanical force of the insulating material is poor, and, when the Shore hardness of the insulating material exceeds 70, buffering force in the insulating material is poor, and therefore, the Shore hardness of the insulating material may be set to 30-70.

Further, in order to improve flowability of the insulating material to completely seal the inside of the outer case, the viscosity of the insulating material may be set to 3,000 mPa-s or less. The pole-mounted transformer using no insulation oil according to the present invention is configured in a completely sealed type and thus generates no pressure from the inside of the pole-mounted transformer, and therefore, does not require protection devices, such as an Internal Fault Detector (IFD), a Pressure Release Valve (PRV) and a Sudden Pressure Release Device (SPRD), which were used in the conventional pole-mounted oil-filled transformer, thereby being capable of achieving cost reduction and having a simplified external shape. Further, the pole-mounted transformer using no insulation oil according to the present invention is sealed in the above-described manner, thereby being capable of reducing noise by 5 dB or more compared to a NEMA noise standard value.

The above-described method may provide an eco-friendly pole-mounted transformer which may substitute for the conventional pole-mounted oil-filled transformer, and thereby, may solve problems caused by use of the conventional pole-mounted oil-filled transformer.

As described above, although the embodiments of the present invention have described that all the elements are coupled into one unit or are operated in a coupled state, the present invention as described above is not limited to these embodiments. That is, all the elements may be selectively coupled to one or more units and be operated, within the scope of the invention. Further, the above-described terms "comprising," "including," and "having," are inclusive and therefore specify the presence of stated elements, but do not preclude the presence or addition of one or more other elements, unless stated otherwise. Further, all terms including technical or scientific terms have the same meanings which are generally understood by those skilled in the art to which the present invention pertains, unless defined otherwise. Terms which are generally used, such as terms defined in dictionaries, should be interpreted as having meanings coinciding with contextual meanings in related technology, and should not be interpreted as having ideally or excessively formal meanings.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Therefore, the embodiments of the present invention described as above have been disclosed for illustrative purpose, and the scope and spirit of the invention are not limited thereby. Therefore, the scope of the present invention is defined not by the detailed description, but by the claims and their equivalents, and all variations within the scope of the claims and their equivalents are to be construed as being included in the present invention.

The invention claimed is:

1. A method for manufacturing a pole-mounted transformer using no insulation oil, comprising:

producing a first coil part by winding a low-voltage coil and a high-voltage coil;

performing casting by putting the first coil part into a mold and injecting a cast insulating material in a liquid state or a gel state into the mold to surround an outer circumferential portion of the first coil part while filling empty spaces in the first coil part, so as to produce a second coil part;

attaching a conductive material to an outer circumferential surface of the second coil part, so as to produce a third coil part;

coupling an iron core to the third coil part; and completing manufacture of a pole-mounted transformer product by inserting the third coil part having the iron core coupled thereto into an outer case;

wherein, when the low-voltage coil is wound, a low-voltage side conductor and a rubber-based solid insulating material formed of a polymer having Shore hardness of 25-75 and elongation of 200-300% are wound together;

wherein, in the producing the first coil part, a conductive member having a surface resistance value of 3,000-8,000 Ω/square is interposed between the low-voltage coil and the high-voltage coil;

wherein the cast insulating material comprises 50-68 wt¾ of silicon dioxide or calcium silicate based on a total weight of the cast insulating material (100 wt¾);

wherein the conductive material has a surface resistance value of 2,000-8,000 Ω/square;

wherein after the third coil part having the iron core coupled thereto is inserted into the outer case, an empty space within the outer case is filled with a polymer-based insulating material having thermal conductivity of 0.5 W/mK or more, Shore hardness of 30-70, viscosity of 3,000 mPa-s or less, and is sealed.

2. The method according to claim 1, wherein, in the producing the first coil part, the low-voltage coil is wound into a circular shape or a polygonal shape, and, when the low-voltage coil is wound into the polygonal shape, edges of the low-voltage coil wound into the polygonal shape are rounded to have a radius of curvature of 10-20 mm.

3. The method according to claim 1, wherein, in the producing the first coil part, at least one of non-woven fabric, an insulating film or insulating paper is interposed between the low-voltage coil and the high-voltage coil.

4. The method according to claim 1, wherein, in the producing the first coil part, when the high-voltage coil is wound, an insulation distance is maintained by interposing at least one of aramid, PEN, PET or glass fiber between layers or discs of the high-voltage coil.

5. The method according to claim 1, wherein a distance between an outer surface of the first coil part and an outer surface of the second coil part is 4-30 mm.

6. The method according to claim 1, wherein, in the coupling the iron core to the third coil part, when a wound core is applied as the iron core, steps of the iron core are located within the wound coils, locating pins are mounted in the locating holes respectively, wherein one end of each of the locating pins extends into the space.

7. A pole-mounted transformer manufactured by the method according to claim 1.

* * * * *